Figure 3:
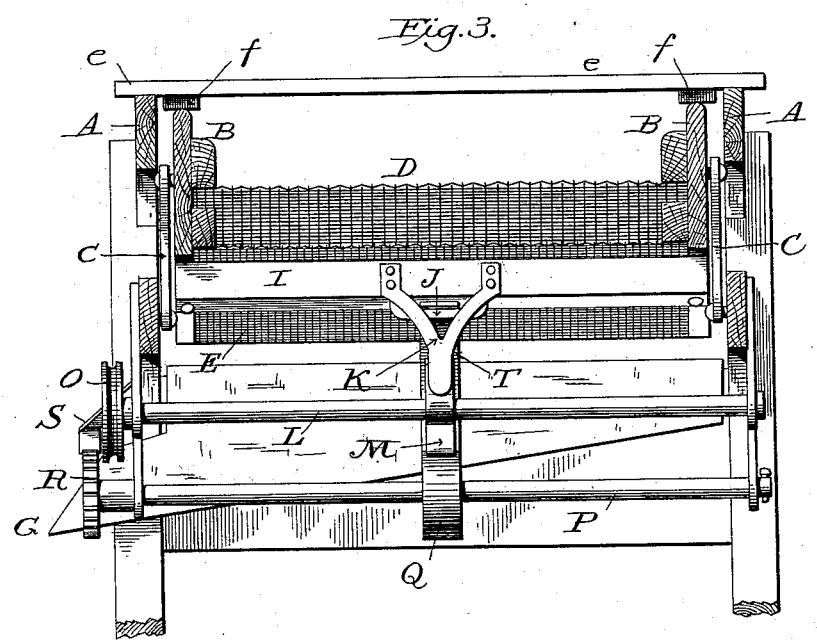

(No Model.) 2 Sheets—Sheet 1.
N. NILSON.
GRAIN SEPARATOR.
No. 376,157. Patented Jan. 10, 1888.
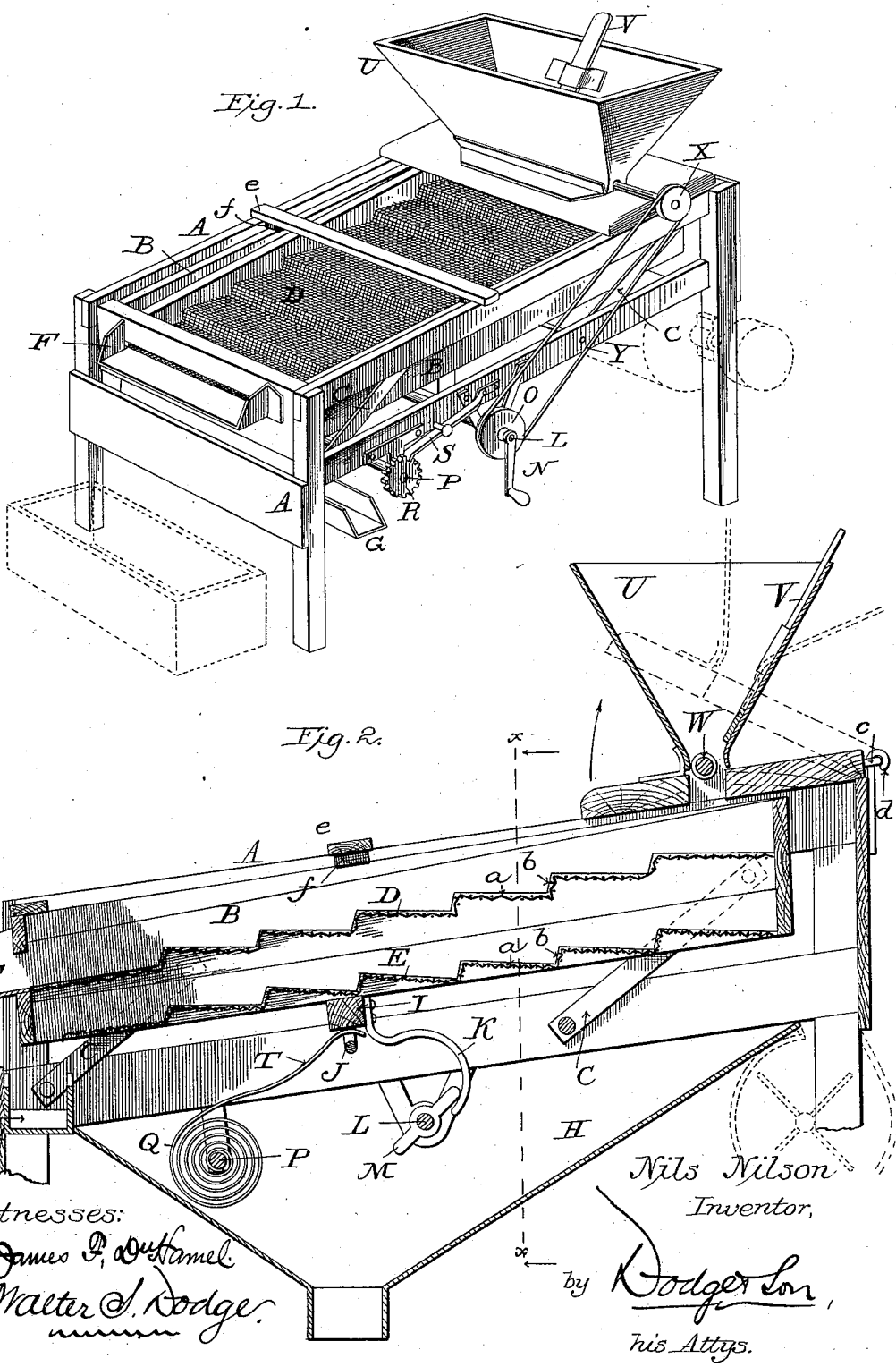
Witnesses:
James F. Duhamel
Walter S. Dodge
Nils Nilson
Inventor,
by Dodge & Son,
his Attys.

(No Model.) 2 Sheets—Sheet 2.

N. NILSON.
GRAIN SEPARATOR.

No. 376,157. Patented Jan. 10, 1888.

Witnesses:
James F. DuHamel
Walter S. Dodge

Nils Nilson,
Inventor,
by Dodge & Son,
his Attys.

UNITED STATES PATENT OFFICE.

NILS NILSON, OF MINNEAPOLIS, MINNESOTA.

GRAIN-SEPARATOR.

SPECIFICATION forming part of Letters Patent No. 376,157, dated January 10, 1888.

Application filed July 21, 1886. Serial No. 208,654. (No model.)

*To all whom it may concern:*

Be it known that I, NILS NILSON, of Minneapolis, in the county of Hennepin and State of Minnesota, have invented certain new and useful Improvements in Grain-Separators, of which the following is a specification.

My invention relates to that class of grain-separators in which a shaking-screen is employed; and it consists in various features, hereinafter set forth and claimed.

In the drawings, Figure 1 is a perspective view of my improved machine; Fig. 2, a vertical longitudinal section of the same, and Fig. 3 a vertical cross section on the line $x\,x$ of Fig. 2.

A indicates a substantial framing, in which the sieve frame or shoe B is mounted, the shoe being connected at its four corners to the framing A by means of links C.

The sieve-frame is of substantially rectangular form, and is provided with two sieves, D and E, parallel with each other, (or approximately so,) the upper sieve, D, being of coarser mesh than the lower one.

As shown in Figs. 1 and 2, these sieves are formed with a series of horizontal portions, $a$, and a series of upright connecting portions, $b$, both portions $a$ and $b$ of the sieve being formed of gauze or perforate material.

By my plan I am enabled to secure better results than have hitherto been accomplished with either the flat perforate sieves or the stepped or offset sieve composed of alternate perforate and imperforate sections, and this is especially the case when a fan is combined with the sieves, as will frequently be done.

The upper sieve, D, discharges at its end through a spout, F.

The material passing through the meshes of the upper sieve falls upon the lower and finer sieve, E, where a second separation takes place, the particles too large to pass through the sieve running off the lower end and discharging into a spout, G, as shown in Figs. 1 and 2. The finest material falls through the sieve E into a large funnel-shaped spout, H, which extends under the sieve E throughout its entire surface, as shown in Fig. 2.

Transversely across the under face of the sieve-frame is a cross-bar, I, which is provided with a loop or eye, J, and with a curved downwardly-extending arm, K, as shown in Figs. 2 and 3.

L indicates a cross-shaft journaled in the framing A or in bearings thereon, and provided with a cross block or tappet, M, in line with and adapted to strike the arm K. The shaft L is further provided with a crank, N, and a band-wheel, O, outside of the framing A, as shown in Fig. 1.

As shown in Figs. 1, 2, and 3, a shaft, P, extends across the framing A, below the sieve-frame, said shaft being provided with a coiled spring, Q, between its ends, and at its outer end with a ratchet or toothed wheel, R, with which engages a spring-pawl, S, secured to the framing. The spring Q is firmly secured to the shaft P, and is provided with a forwardly-extending arm or extension, T, which is inserted in the eye or loop J, and which serves to hold the shoe B in an elevated position. Now, as the shaft L is rotated the tappet M, striking against the arm K, depresses the sieve or shoe and compresses or coils more closely the spring Q. As soon as the arm of the tappet rides off the end of the arm K, the spring Q, through its arm T, throws the shoe or sieve frame suddenly upward and forward to its normal position, ready for its arm K to be again struck by the tappet M.

In order to vary the tension or strength of the spring, it is only necessary to turn the toothed wheel R in one or the other direction and coil or uncoil the spring Q. The spring-pawl S holds the wheel R at any desired adjustment.

U indicates the hopper provided with a feed gate or slide, V, and a feed-roll, W, which latter is provided with a band-wheel, X, which receives motion by a belt, Y, from wheel O.

At the rear edge of the base of the hopper eye or eyes $c$ engage with similar eyes, $d$, secured to the framing A, and thus form a hinge or joint, upon which the hopper may be swung up and back, as indicated by dotted lines in Fig. 2. By thus pivoting or hinging the hopper I am enabled to throw the same back out of the way, in order to have access to the entire surface of the sieves.

Extending across the top of the machine, and secured at its ends to the framing A, is a bar, $e$, which is furnished on its under side with rubber blocks $f$, as shown in Figs. 1, 2, and 3. These rubber blocks are immediately above the side bars of the sieve-frame B, and when the latter is in its highest position it rests against these blocks. When the sieves are shaken, their frame B strikes against these blocks $f$, which cushion the blow and relieve the machine of undue jar, besides rendering the machine comparatively noiseless.

I am aware that it has been proposed to make a stepped sieve wholly of perforate material, that a tapppet and springs have been employed to impart motion to a sieve or screen, and that various features of my machine, separately considered, are old.

The construction herein set forth and claimed is simple and cheap in construction and will be found to work well in practice.

Having thus described my invention, what I claim is—

1. In a separating-machine, the combination, with a frame-work, of a shoe, B, link C, connecting the shoe to the frame-work, a cross-bar, I, secured to the shoe and provided with an eye or loop, J, an arm, K, secured to bar I, a shaft, L, and a tappet, M, mounted thereon to strike the arm K, and a coiled spring, Q, secured to the frame-work and provided with an arm or extension, T, to engage the eye J.

2. In combination with frame-work A, reciprocating sieve frame or shoe B, and connecting-links C, cross-bar I, secured to frame B, arm K, secured to said cross-bar, shaft L, provided with tappet M, and journaled in the frame-work, shaft P, and coiled spring Q, mounted upon said shaft and provided with extension T, to bear against the cross-bar, substantially as shown.

3. In a separating-machine, the combination, with a frame-work, of links C, pivotally connected at their lower ends to the frame-work, a sieve-frame, B, carried at the upper ends of said links C, means for imparting motion to the sieve-frame, a cross-bar, $e$, secured to the frame-work above the sieve-frame, and rubber blocks $f$, secured to the under face of said bar $e$ in position to be struck by the sieve frame.

NILS NILSON.

Witnesses:
WILLIAM KILGORE,
L. W. DOUGLASS.